(12) United States Patent
Choi et al.

(10) Patent No.: US 8,783,576 B2
(45) Date of Patent: Jul. 22, 2014

(54) MEMORY CARD HAVING MULTIPLE INTERFACES AND RESET CONTROL METHOD THEREOF

(75) Inventors: Jong-Sang Choi, Seongnam-si (KR);
Seong-Hyun Kim, Yongin-si (KR);
Sung-Hyun Kim, Anyang-si (KR);
Sang-Bum Kim, Suwon-si (KR);
Joong-Chul Yoon, Seoul (KR);
Sang-Wook Kang, Seoul (KR);
Chul-Joon Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1075 days.

(21) Appl. No.: 11/798,469

(22) Filed: May 14, 2007

(65) Prior Publication Data
US 2008/0013396 A1    Jan. 17, 2008

(30) Foreign Application Priority Data
Jul. 12, 2006    (KR) ................. 10-2006-0065539

(51) Int. Cl.
*G06K 19/06*    (2006.01)
(52) U.S. Cl.
USPC ........................................................ 235/492
(58) Field of Classification Search
USPC ................. 235/380, 381, 487, 492; 365/154; 710/107
See application file for complete search history.

(56) References Cited

U.S. PATENT DOCUMENTS

| | | | |
|---|---|---|---|
| 5,970,069 A * | 10/1999 | Kumar et al. ................. | 370/402 |
| 6,578,768 B1 | 6/2003 | Binder et al. | |
| 7,520,438 B2 | 4/2009 | Kim et al. | |
| 2001/0027032 A1 | 10/2001 | Inomata et al. | |
| 2003/0102380 A1* | 6/2003 | Spencer ........................ | 235/492 |
| 2005/0251593 A1* | 11/2005 | Lin et al. ......................... | 710/62 |
| 2006/0043202 A1* | 3/2006 | Kim et al. ..................... | 235/492 |
| 2006/0214009 A1* | 9/2006 | Shikata et al. ................ | 235/492 |
| 2008/0068470 A1* | 3/2008 | Lee ............................. | 348/231.7 |

FOREIGN PATENT DOCUMENTS

| | | |
|---|---|---|
| CN | 1761346 A | 4/2006 |
| JP | 05-204492 A | 8/1993 |
| JP | 1998-143285 A | 5/1998 |
| JP | 2000-285065 | 10/2000 |
| JP | 2001-319209 | 11/2001 |
| JP | 2003-050646 A | 2/2003 |
| JP | 2006-065867 A | 3/2006 |
| KR | 2001-0042080 | 5/2001 |
| KR | 2002-0085273 | 11/2002 |

* cited by examiner

*Primary Examiner* — Christopher Stanford
(74) *Attorney, Agent, or Firm* — Lee & Morse, P.C.

(57) ABSTRACT

A method and apparatus for resetting a memory card having a plurality of interfaces and a plurality of function blocks, wherein each function block may be associated with a corresponding interface, may include detecting a reset signal for a selected interface of the plurality of interfaces, and interrupting a function block associated with the selected interface. When the selected interface is the only active interface, all function blocks in the memory card may be reset. If interfaces other than the selected interface are active, only the selected interface may be reset.

16 Claims, 3 Drawing Sheets

MEMORY CARD HAVING MULTIPLE INTERFACES AND RESET CONTROL METHOD THEREOF

BACKGROUND OF THE INVENTION

1. Field of the Invention

The present invention relates to a memory card and a reset control method thereof. More particularly, the present invention relates to a memory card having multiple interfaces and reset control method thereof.

2. Description of Related Art

Cards, e.g., smart cards, subscriber identification module cards, and flash cards, operate when connected to a host. The types of hosts which operate with such cards are increasing. Such hosts may include, e.g., mobile phones, MP3 players, portable media players, etc.

In a conventional card, multiple controllers may communicate with a host through corresponding multiple interfaces. For example, a first controller may communicate with the host via a first interface, a second controller may communicate with the host via the second interface, a third controller may communicate with the host via a third interface, etc. The different interfaces may include, e.g., a USB interface, a compact flash interface, an ISO 7816 interface, which is international standard of smart card, etc. The conventional card may also include a reset unit, which may respond to multiple reset signals from the host via the multiple interfaces, and may reset the multiple controllers, i.e., the entire card.

In other words, when the conventional card receives a reset signal through any of the interfaces, the card is entirely reset. Thus, while the host and card may communicate using the multiple interfaces, the host and card may not communicate simultaneously using the multiple interfaces.

SUMMARY OF THE INVENTION

The present invention is therefore directed to a method and apparatus for resetting a memory card having multiple interfaces, which substantially overcome one or more of the problems due to the limitations and disadvantages of the related art.

It is therefore a feature of an embodiment of the present invention to provide an apparatus and method for resetting a memory card having multiple interfaces, which can simultaneously communicate using multiple interfaces.

At least one of the above and other features and advantages of the present invention may be realized by providing a method of resetting a memory card having a plurality of interfaces and a plurality of function blocks, each function block being associated with a corresponding interface, the method including detecting a reset signal for a selected interface of the plurality of interfaces, and interrupting a function block associated with the selected interface.

When a power state of the memory card is turned on, all of the plurality of function blocks may be reset. Before interrupting, a status of interfaces other than the selected interface may be determined. When no interface other than the selected interface is active, all of the plurality of function blocks may be reset.

Detecting the reset signal may include receiving the reset signal, detecting the selected interface associated with the reset signal, and outputting the selected interface to be interrupted.

At least one of the above and other features and advantages of the present invention may be realized by providing an apparatus for controlling resetting of a memory card having a plurality of interfaces and a plurality of function blocks, each function block being associated with a corresponding interface, the apparatus including an interface detector for detecting an interface of the plurality of interfaces having a reset signal provided thereto, a reset block for receiving a reset signal from the plurality of interfaces and the interface from the interface detector, and for outputting an interrupt signal associated with a selected interface to be interrupted, and a processor for receiving the interrupt signal and for interrupting a function block associated with the selected interface.

The apparatus may include a power manager for resetting all of the plurality of function blocks, wherein the reset block may output a reset signal to the power manager when a power state of the memory card is turned on.

The interface detector may further detect a status of interfaces other than the selected interface. The apparatus may include a power manager resetting all of the plurality of function blocks, wherein, when no interface other than the selected interface is active, the reset block outputs a reset signal to the power manager.

At least one of the above and other features and advantages of the present invention may be realized by providing a memory card, including a plurality of interfaces, a plurality of function blocks, each function block being associated with a corresponding interface, an interface detector detecting an interface of the plurality of interfaces having a reset signal provided thereto, a reset block for receiving a reset signal from the plurality of interfaces and the interface from the interface detector, and for outputting a selected interface to be interrupted, and a processor for interrupting the function block associated with the selected interface.

The plurality of interfaces and the plurality of function blocks may be in separate portions of the memory card, and the plurality of interfaces and the plurality of function blocks may be in communication with one another. The plurality of function blocks may be integrated in a single controller.

The memory card may include a power manager for resetting all of the plurality of function blocks, wherein the reset block outputs a reset signal to the power manager when a power state of the memory card is turned on. The interface detector may further detect a status of interfaces other than the selected interface. The power manager may reset all of the plurality of function blocks, wherein, when no interface other than the selected interface is active, the reset block outputs a reset signal to the power manager.

At least one of the above and other features and advantages of the present invention may be realized by providing an article of manufacture having a machine accessible medium including data that, when accessed by a machine, cause the machine to perform a method of resetting a memory card having a plurality of interfaces and a plurality of function blocks, each function block being associated with a corresponding interface, the method including detecting a reset signal for a selected interface of the plurality of interfaces, and interrupting a function block associated with the selected interface.

When a power state of the memory card is turned on, all of the plurality of function blocks may be reset. Before interrupting, a status of interfaces other than the selected interface may be determined. When no interface other than the selected interface is active, all of the plurality of function blocks may be reset. Detecting the reset signal may include receiving the reset signal, detecting the selected interface associated with the reset signal, and outputting the selected interface to be interrupted.

At least one of the above and other features and advantages of the present invention may be realized by providing a reset control system, including a host, a card, a plurality of interfaces between the host and the card, a plurality of function blocks on the card, each function block being associated with a corresponding interface, an interface detector on the card detecting an interface of the plurality of interfaces having a reset signal provided thereto from the host, a reset block on the card for receiving a reset signal from the plurality of interfaces and the interface from the interface detector, and for outputting a selected interface to be interrupted, and a processor on the card for interrupting the function block associated with the selected interface.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
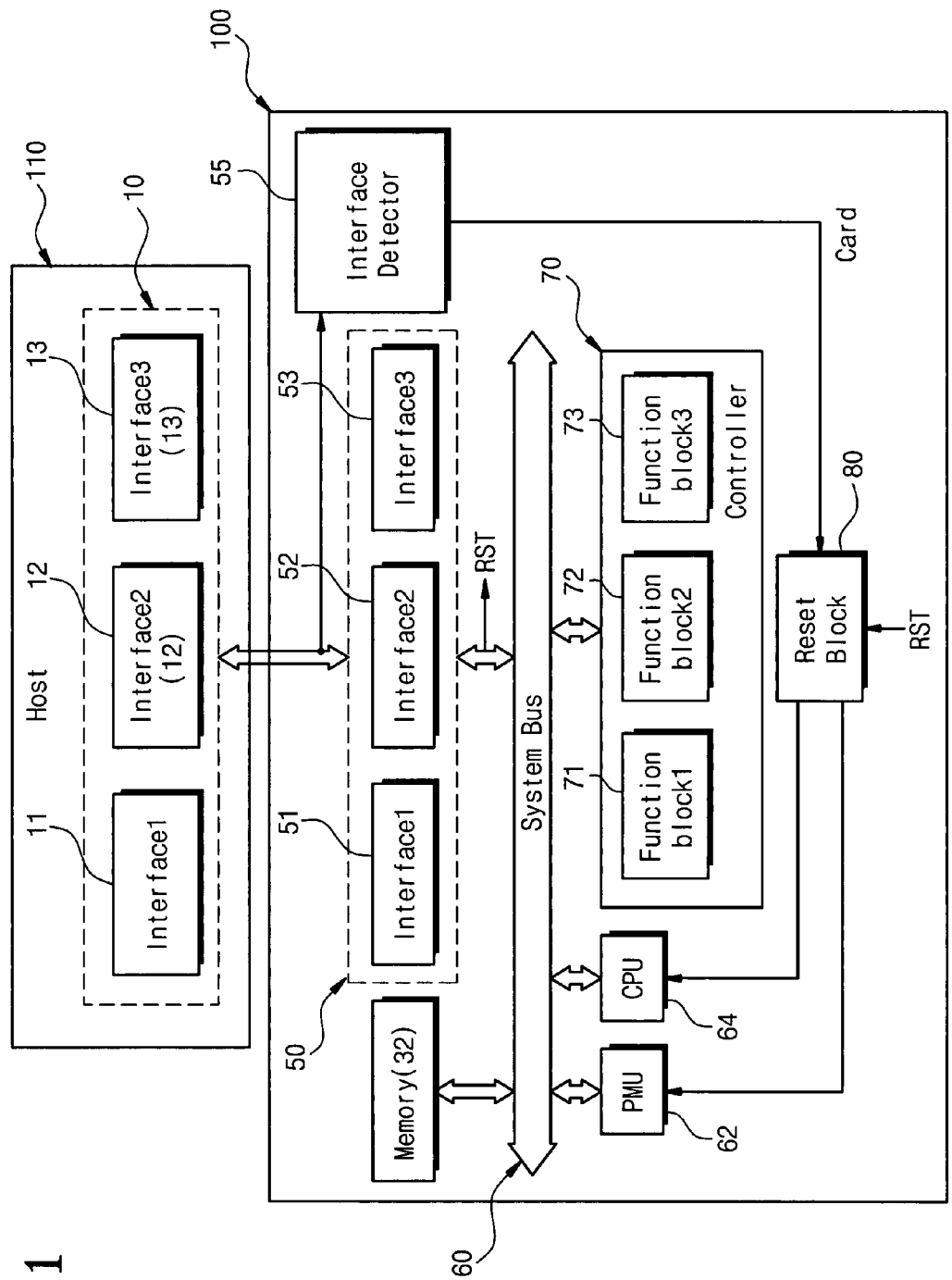
FIG. 1 illustrates a schematic block diagram of a card in communication with a host in accordance with an embodiment of the present invention.

This application claims priority under 35 USC §119 to Korean Patent Application No. 2006-65539, filed on Jul. 12, 2006 in the Korean Intellectual Property Office, the disclosure of which is incorporated herein in its entirety by reference.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. Like reference numerals refer to like elements throughout.

FIG. 1 illustrates a card 100 in communication with a host 110 in accordance with an embodiment of the present invention. As may be seen therein, the host 110 may include a host block 10 including multiple interfaces, e.g., interface1 11, interface2 12, and interface3 13.

The card 100 may include a memory 32, an interface block 50, an interface detector 55, a system bus 60, a power management unit (PMU) 62, a central processing unit (CPU) 64, a controller 70 and a reset block 80. The interface block 50 may include multiple interfaces, e.g., interface1 51, interface2 52, and interface3 53. The controller 70 may include multiple function blocks, respectively corresponding to the multiple interfaces, e.g., function block1 71, function block2 72, and function block3 73. Interfaces in both the host 110 and the card 100 may be any desired interface, e.g., an MMC interface, a USB interface, compact flash, an ISO 7816 interface, etc.

The interface detector 55 may detect which of the interfaces in the interface block 50 are communicating with the host 110, and may supply this information to the reset block 80. The reset block 80 may also receive a reset signal RST from the host 110 via the interface block 50. The reset block 80 may output a signal in accordance with which interface within the interface block 50 the reset signal RST came from and which interfaces are active as detected by the interface detector 55.

For example, if the only active interface is the interface sending the reset signal RST, the reset block 80 may output a reset signal to the PMU 62, which in turn, may reset the entire memory card 100, i.e., all function blocks within the controller 70. If another interface, in addition to the interface sending the reset signal RST, is indicated as being active, the reset block 80 may output an interrupt signal to the CPU 64, which may only reset only a corresponding specific function block, from which the reset signal RST was sent, within the controller 70.

As a particular example, assume the memory card 100 simultaneously communicates with the host 110 via the interface1 51 and the interface2 52. If the reset block 80 receives the reset signal RST via the interface2 52, the reset block 80 may output the interrupt signal to the CPU 64. The CPU 64 may respond the interrupt signal from the reset block 80, and may only reset the function block2 72, corresponding to the interface2 52. Now, if the reset block 80 receives the reset signal RST via the interface1 51, the reset block 80 may output the reset signal to the PMU 62. The PMU 62 may respond the reset signal from the reset block 80, and may reset entire memory card 100, i.e., all function blocks in the controller 70.

Figure 2:
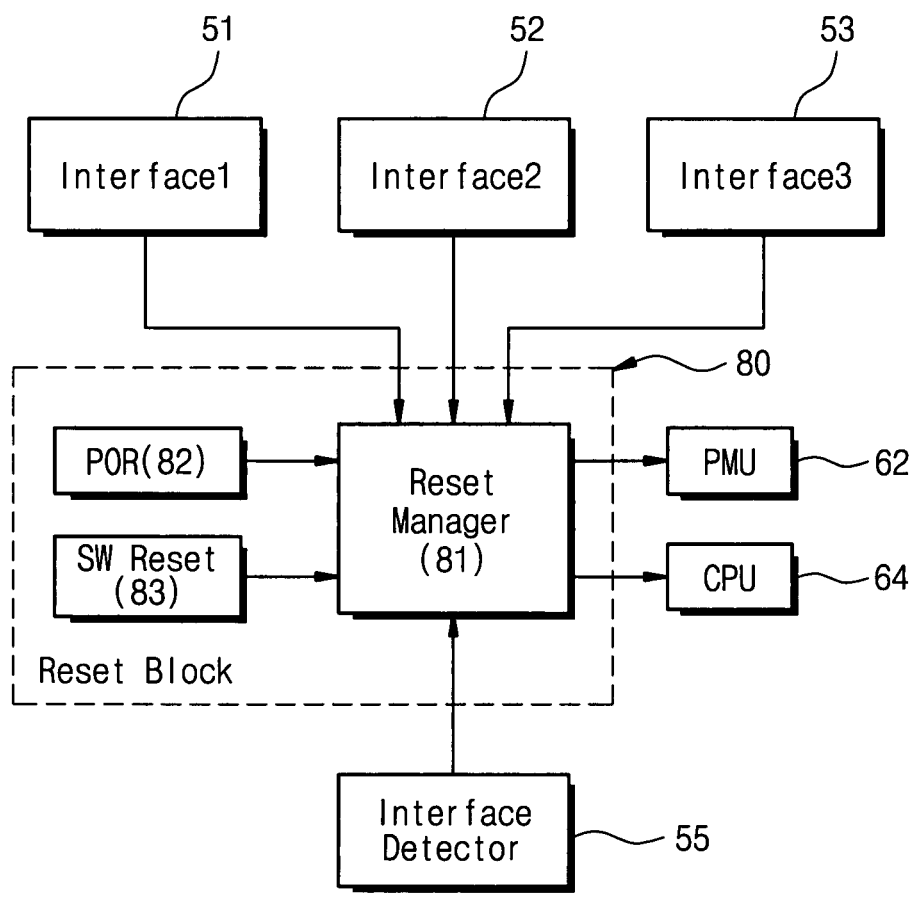
FIG. 2 illustrates a schematic block diagram of a reset block in accordance with an embodiment of the present invention.

FIG. 2 illustrates a detailed schematic block diagram of the reset block 80 in accordance with an embodiment of the present invention. As can be seen therein, the reset block 80 may include a reset manager 81, a power on reset (POR) 82, and a software (SW) reset 83. The reset manager 81 may receive signals from any of the interfaces in the interface block, i.e., the interface1 51, the interface2 52, the interface3 53, from the interface detector 55, from the POR 82, and from the S/W reset 83. In accordance with received signals, the reset manager 81 may output the reset signal to the PMU 62 or the interrupt signal to the CPU 64.

When the memory card is power-on, POR 82 may output the reset signal to the reset manager 81. S/W reset 83 may generate the software reset signal, i.e., the interrupt signal, while the memory card 100 operates normally. When the reset signal is output from the POR 82, the PMU 62 may reset the entire memory card 100. When the interrupt signal is output from the SW reset 83, the CPU may only reset a specific function block within the memory card 100.

Figure 3:
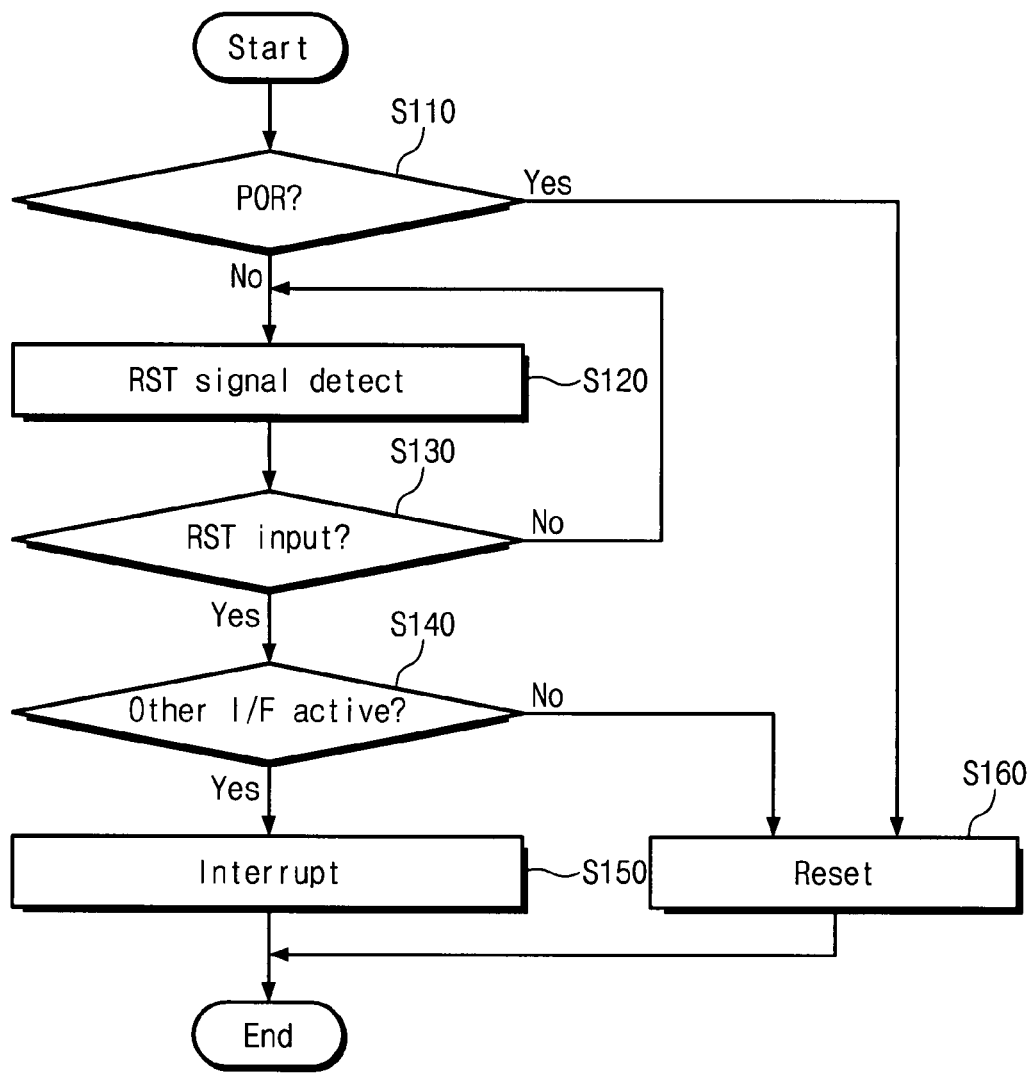
FIG. 3 illustrates a flow chart of a method of resetting a card in accordance with an embodiment of the present invention.

A method of resetting the card 100 in accordance with an embodiment of the present invention is illustrated in the flow chart of FIG. 3. Step S110 may determine whether a POR signal has been activated. If so, then the method may proceed to step S160, which, in turn, may send the reset signal to the PMU 62 to reset the entire card 100. Otherwise, the method may proceed to step S120 to detect a reset signal RST. In step S130, it is determined whether a reset signal RST has been detected. If not, the method returns to step S120. If so, then the method may proceed to step S140 to determine whether another interface is active. If not, then the method may proceed to step S160, which, in turn, may send the reset signal to the PMU 62 to reset the entire card 100. If so, then the interrupt signal may be sent to the CPU 64 to reset only the interface that sent the reset signal RST.

Thus, in accordance with embodiments of the present invention, individual function blocks, rather than the entire card, may be reset. Therefore, simultaneous communication between a host and a memory card using multiple interface may be realized.

Exemplary embodiments of the present invention have been disclosed herein, and although specific terms are employed, they are used and are to be interpreted in a generic and descriptive sense only and not for purpose of limitation. For example, the resetting of the memory card of the present invention may be implemented in software, e.g., by an article of manufacture having a machine-accessible medium including data that, when accessed by a machine, cause the machine to reset the memory card in accordance with methods of the present invention. Accordingly, it will be understood by those of ordinary skill in the art that various changes in form and details may be made without departing from the spirit and scope of the present invention as set forth in the following claims.

What is claimed is:

1. A method of resetting a memory card having a plurality of interfaces and a plurality of function blocks, each function block being associated with a corresponding interface, the method comprising:
    detecting a reset signal for a selected interface of the plurality of interfaces;
    after detecting and before interrupting or resetting, determining a status of one or more interfaces other than the selected interface; and
    resetting the plurality of function blocks in response to detection of the reset signal for the selected interface and when the one or more interfaces other than the selected interface has a different status from the selected interface wherein, when the one or more interfaces other than the selected interface has a same status as the selected interface, then generating a signal to interrupt a function block associated with the selected interface without resetting the function block associated with the one or more interfaces other than the selected interface.

2. The method as claimed in claim 1, wherein, when no interface other than the selected interface is active, resetting the plurality of function blocks.

3. The method as claimed in claim 1, wherein detecting the reset signal comprises:
    receiving the reset signal; and
    detecting the selected interface associated with the reset signal.

4. The method as claimed in claim 1, wherein the selected interface has an active status.

5. An apparatus for controlling resetting of a memory card having a plurality of interfaces and a plurality of function blocks, each function block being associated with a corresponding interface, the apparatus comprising:
    an interface detector for detecting a status of a selected interface of the plurality of interfaces having a reset signal provided thereto, wherein, after detecting and before interrupting or resetting, the interface detector further detects a status of one or more interfaces other than the selected interface;
    a reset block for receiving the reset signal from the selected interface and information indicative of the status of the selected interface and the one or more interfaces other than the selected interface from the interface detector, and for:
    (1) resetting the plurality of function blocks in response to the reset signal from the selected interface and when the one or more interfaces other than the selected interface have a different status from the selected interface, or
    (2) generating a signal to interrupt a function block associated with the selected interface when the one or more interfaces other than the selected interface has a same status as the selected interface, the function block associated with the selected interface interrupted without resetting the function block associated with the one or more other interfaces other than the selected interface; and
    a processor for interrupting the function block associated with the selected interface based on the interrupt signal.

6. The apparatus as claimed in claim 5, further comprising:
    a power manager,
    wherein the reset block communicates with the power manager to reset all of the plurality of function blocks.

7. The apparatus as claimed in claim 5, when no interface other than the selected interface is active, the reset block outputs a signal to the power manager to reset all of the plurality of the function blocks.

8. A memory card, comprising:
    a plurality of interfaces;
    a plurality of function blocks, each function block being associated with a corresponding interface;
    an interface detector detecting a selected interface of the plurality of interfaces having a reset signal provided thereto, wherein, after detecting and before interrupting or resetting, the interface detector further detects a status of one or more interfaces other than the selected interface;
    a reset block for receiving the reset signal from the selected interface and information indicative of the status of the selected interface and the one or more interfaces other than the selected interface from the interface detector, and for:
    (1) resetting the plurality of function blocks in response to detection of the reset signal for the selected interface and when the one or more interfaces other than the selected interface has a different status from the selected interface, or
    (2) generating a signal to interrupt a function block associated with the selected interface when the one or more interfaces other than the selected interface has a same status as the selected interface, the function block associated with the selected interface interrupted without resetting the function block associated with the one or more other interfaces other than the selected interface; and
    a processor to interrupt the function block associated with the selected interface based on the interrupt signal.

9. The memory card as claimed in claim 8, wherein the plurality of interfaces and the plurality of function blocks are in separate portions of the memory card, and the plurality of interfaces and the plurality of function blocks are in communication with one another.

10. The memory card as claimed in claim 9, wherein the plurality of function blocks is integrated in a single controller.

11. The memory card as claimed in claim 8, further comprising a power manager for resetting the plurality of function blocks in response to a signal from the reset block.

12. The memory card as claimed in claim 8, further comprising a power manager for resetting the plurality of function blocks in response to a signal from the reset block.

13. An article of manufacture having a machine accessible medium including data that, when accessed by a machine, cause the machine to perform a method of resetting a memory card having a plurality of interfaces and a plurality of function blocks, each function block being associated with a corresponding interface, the method comprising:

detecting a reset signal for a selected interface of the plurality of interfaces;

after detecting and before interrupting or resetting, determining a status of one or more interfaces other than the selected interface; and resetting the plurality of function blocks in response to detection of the reset signal for the selected interface and when the one or more interfaces other than the selected interface has a different status from the selected interface wherein, when the one or more interfaces other than the selected interface has a same status as the selected interface, then generating a signal to interrupt a function block associated with the selected interface without resetting the function block associated with the one or more interfaces other than the selected interface.

14. The article as claimed in claim 13, wherein, when no interface other than the selected interface is active, resetting the plurality of interfaces.

15. The article as claimed in claim 13, wherein detecting the reset signal comprises:

receiving the reset signal; and detecting the selected interface associated with the reset signal.

16. A reset control system, comprising:

a host;

a card;

a plurality of interfaces between the host and the card;

a plurality of function blocks on the card, each function block being associated with a corresponding interface;

an interface detector on the card detecting a selected interface of the plurality of interfaces having a reset signal provided thereto from the host, wherein, after detecting and before interrupting or resetting, the interface detector detects a status of one or more interfaces other than the selected interface; and a reset block on the card for receiving the reset signal from the selected interface and information indicative of the status of the selected interface and the one or more interfaces other than the selected interface from the interface detector, and for:

(1) resetting the plurality of function blocks in response to detection of the reset signal for the selected interface and when the one or more interfaces other than the selected interface has a different status from the selected interface, or (2) generating a signal to interrupt a function block associated with the selected interface when the one or more interfaces other than the selected interface has a same status as the selected interface, the function block associated with the selected interface interrupted without resetting the function block associated with the one or more other interfaces other than the selected interface.

* * * * *